United States Patent
Nagaratnam et al.

(10) Patent No.: US 11,095,654 B2
(45) Date of Patent: *Aug. 17, 2021

(54) LEVERAGING SOCIAL RELATIONSHIPS TO ENHANCE COMPUTER SECURITY

(71) Applicant: International Business Machines Corporation, Armonk, NY (US)

(72) Inventors: Nataraj Nagaratnam, Cary, NC (US); Kapil K. Singh, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 81 days.

This patent is subject to a terminal disclaimer.

(21) Appl. No.: 16/402,672

(22) Filed: May 3, 2019

(65) Prior Publication Data

US 2019/0260756 A1     Aug. 22, 2019

Related U.S. Application Data

(63) Continuation of application No. 15/196,257, filed on Jun. 29, 2016, now Pat. No. 10,389,725.

(51) Int. Cl.
*H04L 29/06* (2006.01)

(52) U.S. Cl.
CPC ........ *H04L 63/102* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 7,100,053 B1 | 8/2006 | Brown | |
| 9,154,514 B1 | 10/2015 | Prakash | |
| 9,306,985 B1 | 4/2016 | Liu | |
| 9,563,782 B1 | 2/2017 | Brisebois | |
| 9,794,293 B1 | 10/2017 | Martin | |
| 9,842,218 B1 | 12/2017 | Brisebois | |
| 10,389,725 B2* | 8/2019 | Nagaratnam | ....... H04L 63/1416 |
| 2008/0162510 A1 | 7/2008 | Baio | |
| 2010/0125490 A1 | 5/2010 | Kiciman et al. | |
| 2011/0047473 A1* | 2/2011 | Hanna | ................. H04L 63/0876 715/740 |
| 2012/0278625 A1 | 11/2012 | Narayanan et al. | |

(Continued)

OTHER PUBLICATIONS

Li et al., "Leveraging Social Networks to Combat Collusion in Reputation Systems for Peer-to-Peer Networks," IEEE Transactions on Computer, vol. 62, No. 9, Sep. 2013, 15 pages.

(Continued)

*Primary Examiner* — Benjamin E Lanier
(74) *Attorney, Agent, or Firm* — VanLeeuwen & VanLeeuwen; Jeffrey S. LaBaw

(57) ABSTRACT

An approach is provided that enhances computer system security. In the approach, a set of users is authorized to be notified when any of a selected set of activities occurs on the user's account. When the system detects that one of the activities has occurred on the account, a notification is sent to the set of authorized users. The set of users may individually send a responsive security response to protect the user's account. Responsive to receiving the security response from one of the set of users, a security action is performed that is anticipated to protect the user's account.

20 Claims, 6 Drawing Sheets

(56) References Cited

U.S. PATENT DOCUMENTS

| | | |
|---|---|---|
| 2013/0017806 A1 | 1/2013 | Sprigg |
| 2013/0086254 A1 | 4/2013 | Bhola |
| 2013/0173798 A1 | 7/2013 | Micucci et al. |
| 2013/0219459 A1 | 8/2013 | Bradley |
| 2015/0180746 A1 | 6/2015 | Day, II |
| 2016/0148211 A1 | 5/2016 | Stibel |
| 2016/0182559 A1 | 6/2016 | Francy |
| 2016/0300230 A1 | 10/2016 | Cha |
| 2017/0149795 A1 | 5/2017 | Day, II |
| 2018/0007056 A1 | 1/2018 | Nagaratnam et al. |

OTHER PUBLICATIONS

IBM, "Method and Process for Leveraging Social Networks in Collaborative Interfaces," IP.com No. 000152424, May 2007, 3 pages.

Moriarty et al., "Real-time Inter-network Defense (RID)," Internet Society Requests for Comment, Internet Engineering Task Force (IETF), IP.com No. 000216885, Apr. 2012, 169 pages.

IBM, "A System and Method for ensuring that important electronic messages are read and sufficiently processed —leveraging trust relationships in social networks," IP.com No. 000178265, Jan. 2009, 3 pages.

"List of IBM Patents or Patent Applications Treated as Related," Letter from Leslie A. Van Leeuwen, May 3, 2019, 1 page.

\* cited by examiner

LEVERAGING SOCIAL RELATIONSHIPS TO ENHANCE COMPUTER SECURITY

BACKGROUND OF THE INVENTION

Technical Field

This disclosure relates to using social relationships amongst users in order to enhance individual user's computer security.

Description of Related Art

It is typical for computer systems to be compromised at instances where the systems are not being directly monitored or controlled by their direct, or administrative, users. An unattended computer system is desirable for the adversary, such as a malevolent user, as it enables the malevolent user to execute unauthorized tasks without being detected and with minimal disruption. Additionally, users have different levels of competency in protecting their systems, thereby enabling the adversary to successfully target less proficient users. The security of such systems rely on the users' ability to successfully install security software. The ability of security software to successfully detect malicious activity and the ability of the user further protect the computer system via other channels of attack (such as social engineering attacks, etc.), might be limited, providing the malevolent user an avenue to obtain access to, and data from, the user's system. Attacks targeting users and security software have been consistently successful over the years and highlight the limitations of their abilities. While security software is limited in functionality and with the plethora of new attacks originating every day, users often fall prey to social engineering attacks such as phishing, etc.

SUMMARY

An approach is provided that enhances computer system security. In the approach, a set of users is authorized to be notified when any of a selected set of activities occurs on the user's account. When the system detects that one of the activities has occurred on the account, a notification is sent to the set of authorized users. The set of users may individually send a responsive security response to protect the user's account. Responsive to receiving the security response from one of the set of users, a security action is performed that is anticipated to protect the user's account.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
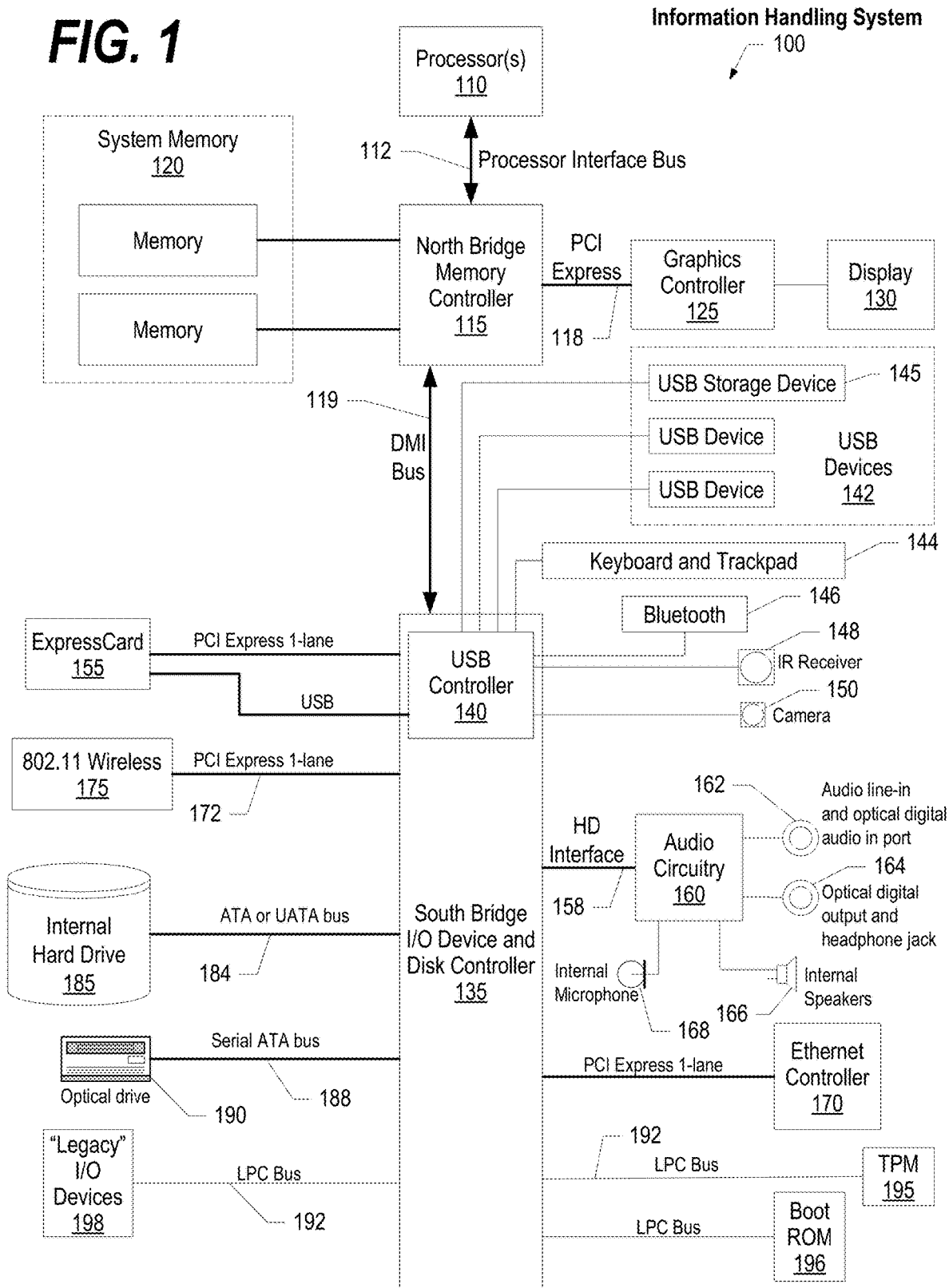
FIG. 1 depicts a block diagram of a processor and components of an information handling system.

FIGS. 1-6 depict an approach that enhances computer security. In the approach, a set of users is authorized to be notified when any of a set of activities occurs on an account of the user that is being monitored. When an activity is detected, the approach sends notifications to the set of users informing the set of users that an activity has been detected at the account of the user that is being monitored. Any of the set of users can send a security response that, when received, causes the system to perform a security action that is anticipated to protect the user's account from harm.

The idea behind this approach is to leverage users' real-world social relationships for enhancing the security of their systems. Users that are part of a "community" (such as being on the same team, office, social network, etc.) can monitor actions of others to identify anomalies. For example, if a team member X knows that the other team member Y is on vacation to Hawaii and X observes access to sensitive data originating from Y's account, X can identify the security anomaly.

One limitation of an automated system is that it might not be aware of the external conditions/circumstances that are not explicitly communicated to the system by its users. As a result, even if the system can automatically learn the users' behavior, it might be limited by the data available for learning. In other cases, the automated system cannot collect certain privacy-sensitive data, such as geolocation, from the users. On the other hand, such information might be available to other community members due to their personal/community relationship with the system user. Imagine a use case where a user forgets his work laptop in office that is physically observed by other team members. If the system shows certain access that requires explicit presence of the user from that laptop, that can be marked as anomalous by other team members. This approach pertains to a system that enables users within a community to proactively watch each other's activities. This would include a system that enables users or the system to provide prior permission to what can be monitored and by whom, and generation of user-friendly alerts on specific activities.

In the approach, the user being monitored provides pre-authorization to community members to observe certain behavior occurring on the user's account or accounts. Such authorization could also be mandated by corporate policies. The system would provide user-friendly interfaces for community members to observe the approved activities either by logging into the system or by received pre-defined alerts. The community members may also inform the system for any anomalous activities that they observed even if no explicit alerts are sent to them. For example, if they observe the emails coming from a user's corporate account when they explicitly know that the user has no access to that account while on vacation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
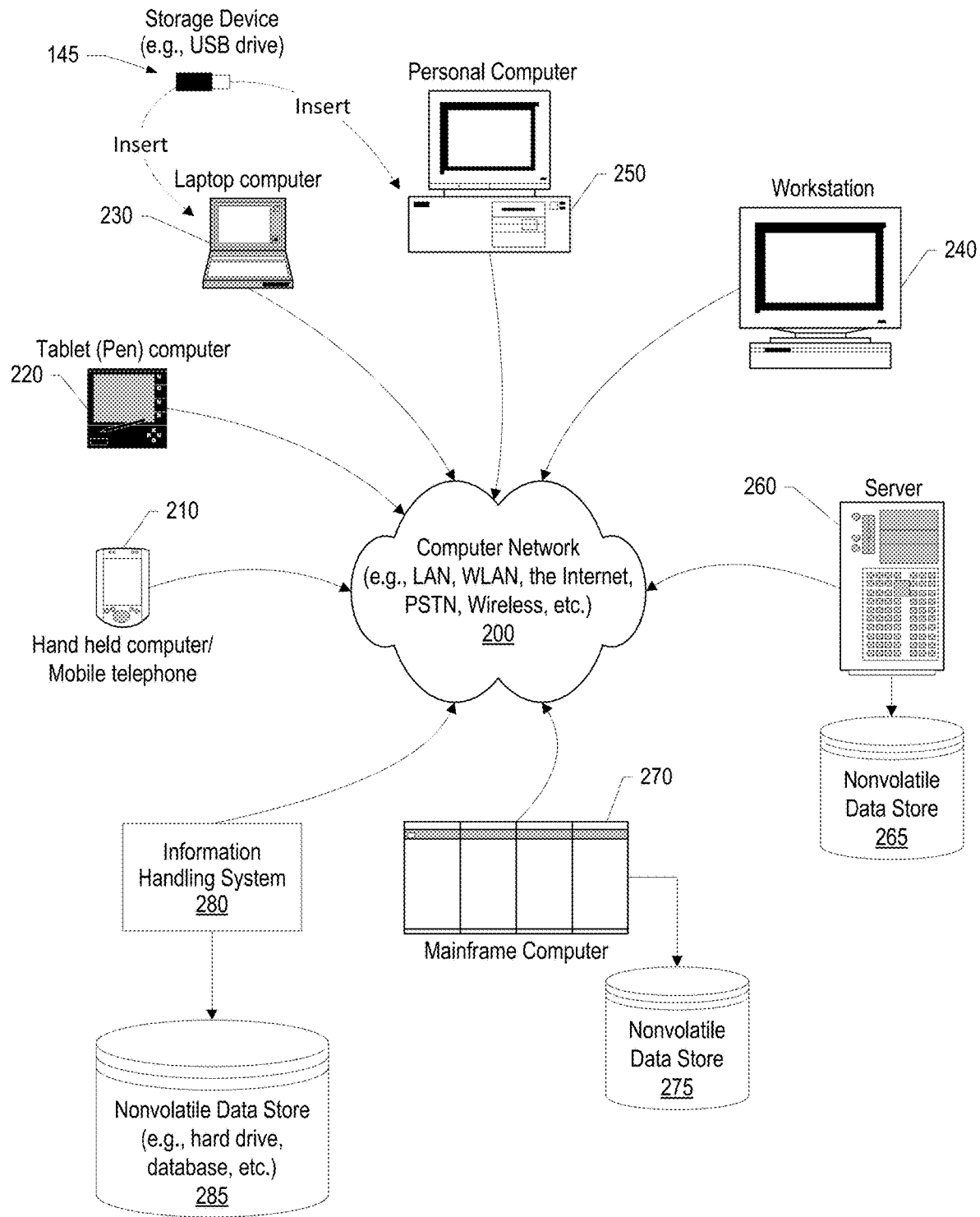
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
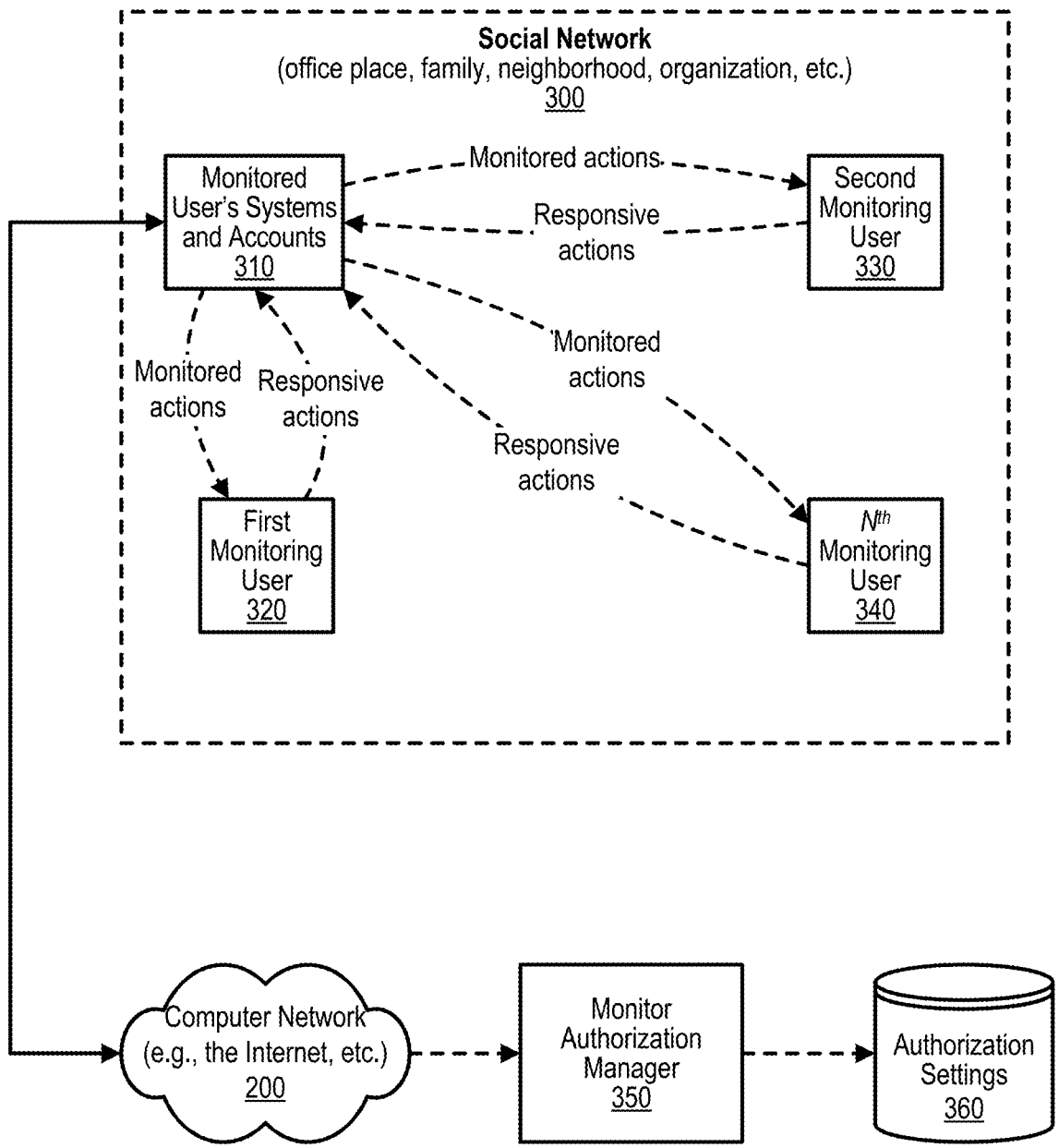
FIG. 3 is a diagram depicting components used in using a social network of users to protect a user's account from malevolent activity.

FIG. 3 is a diagram depicting components used in using a social network of users to protect a user's account from malevolent activity. Social network 300 may be any network where members know other members to some extent. For example, a social network might be an office place, friends, one or more families, a neighborhood, an organization, a social media network, or the like. In one embodiment, any of the members of social network 300 can choose to authorize a set of users chosen from the social network.

In FIG. 3, the user that has authorized others to monitor one or more of the user's accounts, also referred to as "the first user," is depicted as monitored user's systems and accounts 310. The users that have been authorized to be notified when any of a selected set of activities occurs on the first user's account(s) are depicted as first, second, and Nth users 320, 330, and 340, respectively. As shown, when any of a selected set of activities occurs on the account associated with the first user, notifications are sent to the set of users that have been authorized to receive such information. The authorized users, having received notifications regarding activities occurring on the first user's account, are able to request responsive actions to assist the first user in protecting the user's online accounts.

For example, if First Monitoring User 320 receives a notification that someone is using the first user's email, but user 320 knows that the first user is out of town without email access, then user 320 can send a security response that requests that additional security steps be performed. In the example above, perhaps the first user forgot to close his email before leaving his office, so user 320 may have requested that a "sign off" be performed on the first user's email account so that the username and password will have to be entered before further email activities can be performed. Another possible security response might be to perform a "system shutdown" on the first user's system to physically shut down the first user's computer system so that any malevolent user physically accessing the first user's system will be unable to perform any other activities on the first user's system.

In FIG. 3, the notification of activities and security responses are shown being transmitted directly between the user's system, or account, and the authorized users. In another embodiment, a third-party system, such as monitor authorization manager 350 can be utilized to facilitate communication between the first user and the authorized users. In this alternative embodiment, monitor authorization manager 350 maintains authorization settings data store 360 that may pertain to authorization settings for many different users. Computer network 200, such as a local area network, the Internet, or other network that interconnects computer systems is used to systems of connected members of social network 300. Computer network 200 is also used to connect monitor authorization manager 350, if used, with the various systems included in social network 300, such as the first user's system and the systems corresponding to the set of authorized users.

Figure 4:
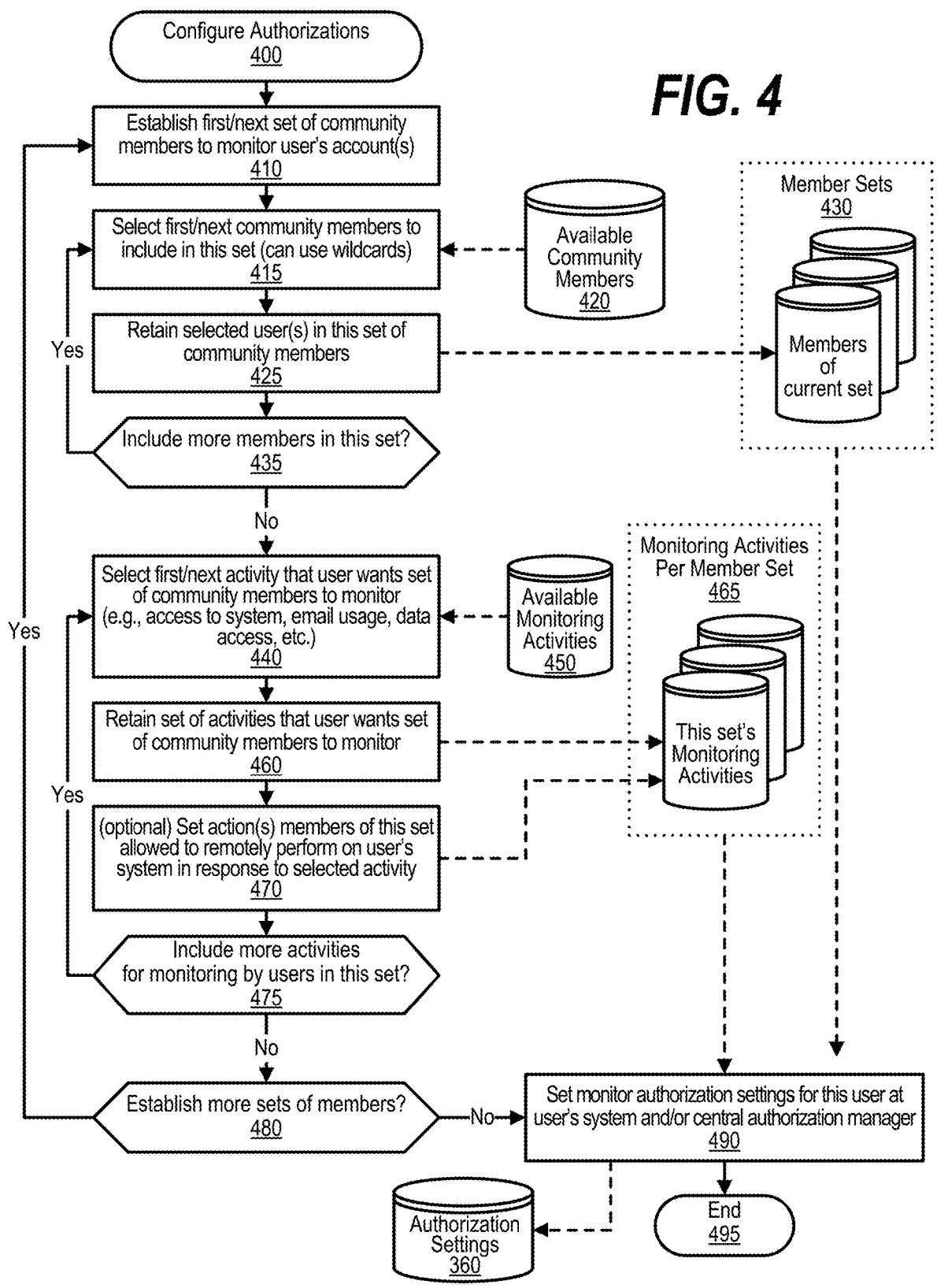
FIG. 4 is a flowchart showing setup steps taken by the user to authorize a set of users that are notified when any of a set of activities occurs on the user's account.

FIG. 4 is a flowchart showing setup steps taken by the user to authorize a set of users that are notified when any of a set of activities occurs on the user's account. FIG. 4 processing commences at 400 and shows the steps taken by a process that authorizes a set of users that are notified when any of a selected set of activities occurs on the first user's account. At step 410, the process establishes the first set of community members to monitor one or more of the first user's accounts. As shown, multiple sets of authorized users can be established, perhaps to monitor different types of accounts for the user. For example, one set of authorized users to monitor the first user's business related accounts, and another set of authorized users to monitor the first user's personal accounts, etc. At step 415, the process selects the first community members to include in this set of users. In one embodiment, the user can use wildcards, to include multiple members from the group (e.g., all members with a particular last name, etc.). The available community members are retrieved from data store 420. In a social media network the available community members would be other members (e.g., "friends," "contacts," etc.) in the social media network. In another type of social network, such as a family, neighborhood group, or the like, the available community members would be the other members of such social network. At step 425, the process retains the selected user(s) in this set of community members. The authorized set of users are stored in data store 430. As shown, the user can establish multiple sets of users, such as a set of work place colleagues to monitor a work account, and a set of family members to monitor the user's personal email account, etc. The process determines as to whether the user wants to include more members in the current set of users (decision 435). If the user wants to include more members in the current set of users, then decision 435 branches to the 'yes' branch which loops back to step 415 to select additional users to include in this set of users. This looping continues until the user no longer wants to add more members in the current set of users, at which point decision 435 branches to the 'no' branch exiting the loop.

At step 440, the process selects the first activity that user wants set of community members to monitor (e.g., access to system, email usage, data access, etc.). The activities available for monitoring are selected from data store 450. At step 460, the process retains the selected activities in the set of activities that the user wants this set of community members to monitor on the first user's account. At step 470, the process receives a selection of one or more security actions that correspond to security responses that members of this set of users are allowed to remotely perform on the first user's account in response to the selected activity or activities being detected. The process determines as to whether the user wishes to include more activities for monitoring by users in this set of users (decision 475). If the user wishes to include more activities for monitoring by users in this set of users, then decision 475 branches to the 'yes' branch which loops back to step 440 to receive and process the next activity that the user desires to have monitored. This looping continues until there are no more activities that the first user wants to have monitored, at which point decision 475 branches to the 'no' branch exiting the loop.

The process determines as to whether the first user wants to establish additional sets of users to monitor the first user's accounts (decision 480). If the first user wants to establish additional sets of users to monitor the first user's accounts, then decision 480 branches to the 'yes' branch which loops back to step 410 to establish the next set of users as described above. This looping continues until the first user does not want to establish any more sets of users, at which point decision 480 branches to the 'no' branch exiting the loop. At step 490, the process retains the monitor authorization settings established by the user to monitor the user's accounts. The monitor authorization settings include the various sets of users authorized to be notified, the various selected sets of activities that are being monitored, and the responsive actions that users included in the authorized set of users are allowed to perform when an activity is detected. The monitor authorization settings are stored at one or more of the user's systems and/or a central authorization manager, such as Manager 350 depicted in FIG. 3. FIG. 4 processing thereafter ends at 495.

Figure 5:
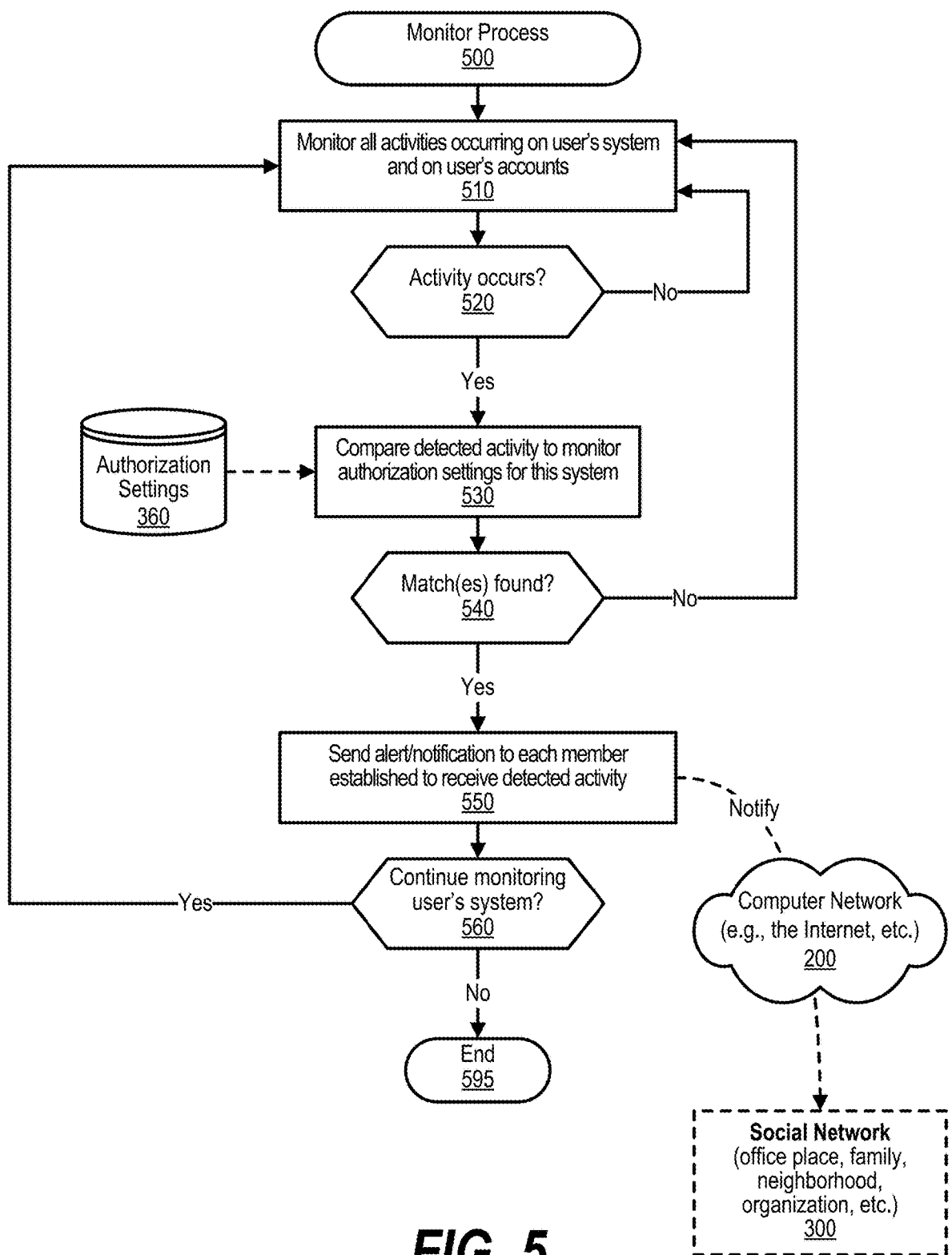
FIG. 5 is a flowchart showing a monitoring process that monitors the user's account for certain activities and, when such activities are detected, the process notifies the set of authorized users.

FIG. 5 is a flowchart showing a monitoring process that monitors the user's account for certain activities and, when such activities are detected, the process notifies the set of authorized users. FIG. 5 processing commences at 500 and shows the steps taken by a process that monitors activity occurring at a user's account. At step 510, the process monitors all activities occurring at the user's accounts or on the user's computer system. The process determines as to whether any activity occurs at the user's accounts (decision 520). If activity occurs, then decision 520 branches to the 'yes' branch for further processing of the activity. On the other hand, if no activity occurs, then decision 520 branches to the 'no' branch which repeatedly loops back to step 510 to continue monitoring the user's accounts.

When an activity is detected then, at step 530, the process compares the detected activity to the monitor authorization settings for the account on which the activity was detected. The monitor authorization settings are retrieved from data store 360. The monitor authorization settings include the selected set of activities corresponding to this account as well as the authorized set of users that are notified when one of the activities from the selected set of activities occurs. The process determines as to whether any matches were revealed based on the comparison of step 530 (decision 540). If any matches were found, revealing that an activity occurred that matches one of the selected set of activities stored in the monitor authorization settings, then decision 540 branches to the 'yes' branch to further process the activity and send notifications to the authorized set of users. On the other hand, if no matches were found, perhaps indicating that the activity is not potentially dangerous to the user's account and data sensitivity, then decision 540 branches to the 'no' branch which loops back to step 510 to continue monitoring the user's accounts for activity.

When a match is found by decision 540, revealing that an activity occurred that matches one of the selected set of activities stored in the monitor authorization settings then, at step 550, the process sends a notification to each of the authorized set of users that the detected activity occurred on one of the user's accounts. The notifications are transmitted, via computer network 200, to each of the set of users authorized by the first user to receive the notifications regarding the user's account activity with the set of users being from a common social network 300. In this manner, the authorized set of users are provided knowledge of the detected activity occurring on the account of the first user while not providing such authorized users with access to content data pertaining to the first account, such as bank account balances, email contents, and the like.

Figure 6:
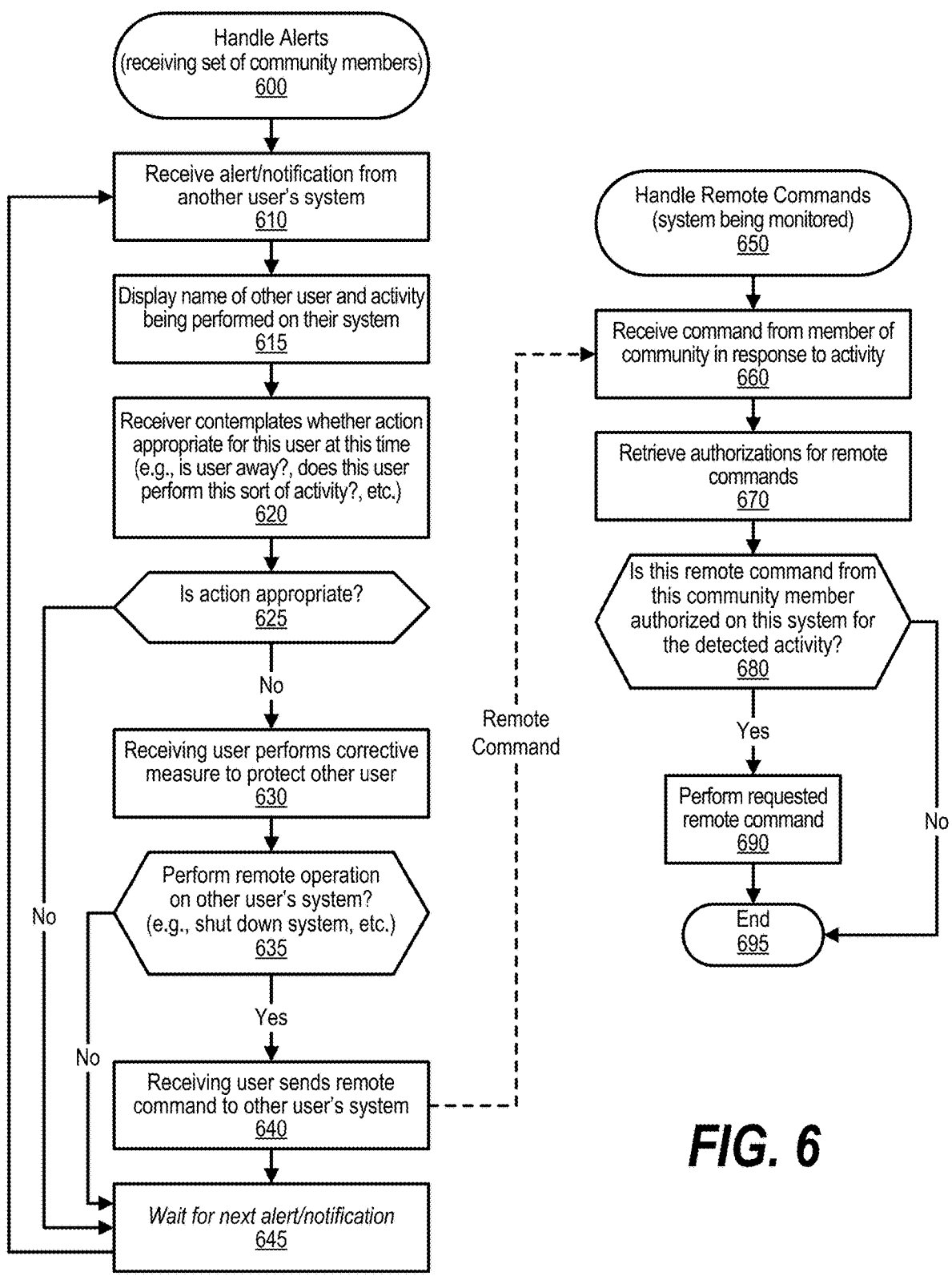
FIG. 6 is a flowchart showing security action steps performed when one of the authorized users sends a security response that requests that a security action be performed to protect the user's account.

As shown in FIG. 6, the set of authorized users can responsively send security responses that are processed to protect the first user's account. The process determines whether to continue monitoring user's accounts (decision 560). If monitoring of the user's accounts continues, then decision 560 branches to the 'yes' branch which loops back to step 510 to continue monitoring the accounts. This looping continues until monitoring of the user's accounts is no longer desired (e.g., system shutdown, the first user terminates the monitoring process, etc.), at which point decision 560 branches to the 'no' branch exiting the loop. FIG. 5 processing thereafter ends at 595.

FIG. 6 is a flowchart showing security action steps performed when one of the authorized users sends a security response that requests that a security action be performed to protect the user's account. FIG. 6 processing commences at 600. Steps 600 through 645 show the processing that handles notifications received by the set of authorized users and steps 650 through 695 show the processing that handles security responses submitted by the set of users to respond to the activity to which the users were notified. At step 610, the process running at each of the set of authorized users receives the notification from another user's system regarding an activity occurring at that user's account. At step 615, the process displays the name of other user whose account has activity detected and also displays the activity that was detected at the user's account. At step 620, each of the set of authorized users that received the notification contemplates whether the action displayed is appropriate for the other user at this time. For example, the set of authorized users might know if the user is away and not using their account, whether the user performs this sort of activity, and the like.

The user receiving the notification determines whether the action performed on the first user's account is appropriate given the circumstances (decision 625). If the action is appropriate, then decision 625 branches to the 'yes' branch to bypass the remaining steps. On the other hand, if the user deems that the action is inappropriate given the circumstances, then decision 625 branches to the 'no' branch to perform steps 630 through 640. At step 630, the user that received the notification performs one or more corrective measures to protect the first user's account from harm. For example, if nearby, the user might walk over to the first user's computer system and shutdown the system. The user receiving the notification determines whether perform a remote operation, such as shutting down a system, locking an account, etc., on behalf of the first user (decision 635).

If the user receiving the notice decides to perform a remote operation on the first user's account, then decision 635 branches to the 'yes' branch to perform step 640. On the other hand, if the user receiving the notice does not decide to perform a remote operation on the first user's account, then decision 635 branches to the 'no' branch bypassing step 640. At step 640, the process being operated by the user that received the notification sends a security response pertaining to the first user's account with the security response corresponding to a security action that the receiving user deems appropriate to protect the first user's account given the circumstances. At step 645, the process operating on the devices used by the set of authorized users waits for the next notification to be received pertaining to the first user's account(s). When the next notification is received, processing branches back to step 610 to process the notification as described above.

FIG. 6 processing that handles security responses submitted by the set of users to respond to the activity to which the users were notified commences at 650. At step 660, the process receives the security response from a member of social network in response to activity performed on one of the first user's accounts. At step 670, the process retrieves authorizations for remote commands that were previously established for the first user's account. The process determines as to whether is this remote command from this community member authorized on this system for the detected activity (decision 680). If is this remote security response from this community member is authorized on the first user's account in response to the detected activity, then decision 680 branches to the 'yes' branch whereupon, at step 690, the process performs the security action corresponding to the security response, with the security action anticipated to protect the first user's account. On the other hand, if either the user sending the security response is not authorized or the security response is not authorized given the detected activity, then decision 680 branches to the 'no' branch bypassing step 690. FIG. 6 processing to handle security responses thereafter ends at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of enhancing computer security comprising steps of:
   receiving one or more monitoring authorization settings from a first user, wherein the monitoring authorization settings comprise a set of users authorized to monitor a first account associated with the first user, a set of selected activities to be monitored, and one or more remote security actions that the set of users is allowed to remotely perform on the first account, wherein the set of users does not include the first user;
   sending notifications to the set of users responsive to a detection of one of the selected set of activities occurring on the first account;
   after the sending, receiving a security response from a second user included in the set of users, wherein the security response includes a remote signoff command; and
   in response to receiving the security response and determining that the remote signoff command is one of the one or more remote security actions that the set of users is allowed to remotely perform, remotely signing the first computer user off the first account.

2. The method of claim 1 wherein the set of users and the first user each belong to a common online social network.

3. The method of claim 1 wherein the set of users and the first user each belong to a common organization.

4. The method of claim 1 further comprising:
   providing knowledge of the detected activity occurring on the first account to the set of users, while inhibiting access to first account content data from each of the set of users.

5. The method of claim 1 further comprising:
   responsive to receiving the security response from the second user:
      comparing the received security response to the one or more remote security actions that the set of users is allowed to remotely perform on the first account; and
      in response to determining that the remote signoff command is not one of the one or more security actions that the set of users is allowed to remotely perform on the first account, inhibiting performance of the remote signoff command.

6. The method of claim 1 further comprising:
   identifying a set of appropriate security actions based on the detected activity occurring on the first account;
   comparing the remote signoff command received from the second user to the set of appropriate security actions;
   performing the remote signoff command in response to the comparison revealing that the remote signoff command matches one of the set of appropriate security actions; and
   inhibiting performance of the remote signoff command in response to the comparison revealing that the remote signoff command fails to match at least one of the set of appropriate security actions.

7. The method of claim 1 wherein the selected set of activities is selected according to a security policy.

8. An information handling system comprising:
   one or more processors;
   a memory coupled to at least one of the processors; and
   a set of computer program instructions stored in the memory and executed by at least one of the processors in order to enhance system security by performing actions comprising:
      receiving one or more monitoring authorization settings from a first user, wherein the monitoring authorization settings comprise a set of users authorized to monitor a first account associated with the first user, a set of selected activities to be monitored, and one or more remote security actions that the set of users is allowed to remotely perform on the first account, wherein the set of users does not include the first user;
      sending notifications to the set of users responsive to a detection of one of the selected set of activities occurring on the first account;
      after the sending, receiving a security response from a second user included in the set of users, wherein the security response includes a remote signoff command; and
      in response to receiving the security response and determining that the remote signoff command is one of the one or more remote security actions that the set of users is allowed to remotely perform, remotely signing the first computer user off the first account.

9. The information handling system of claim 8 wherein the set of users and the first user each belong to a common online social network.

10. The information handling system of claim 8 wherein the set of users and the first user each belong to a common organization.

11. The information handling system of claim 8 wherein the actions further comprise:

provided knowledge of the detected activity occurring on the first account to the set of users, while inhibiting access to first account content data from each of the set of users.

12. The information handling system of claim 8 wherein the actions further comprise:

responsive to receiving the security response from the second user:

comparing the received security response to the one or more remote security actions that the set of users is allowed to remotely perform on the first account; and in response to determining that the remote signoff command is not one of the one or more security actions that the set of users is allowed to remotely perform on the first account, inhibiting performance of the remote signoff command.

13. The information handling system of claim 8 wherein the actions further comprise:

identifying a set of appropriate security actions based on the detected activity occurring on the first account;

comparing the remote signoff command received from the second user to the set of appropriate security actions;

performing the remote signoff command in response to the comparison revealing that the remote signoff command matches one of the set of appropriate security actions; and inhibiting performance of the remote signoff command in response to the comparison revealing that the remote signoff command fails to match at least one of the set of appropriate security actions.

14. The information handling system of claim 8 wherein the selected set of activities is selected according to a security policy.

15. A computer program product stored in a computer readable storage medium, comprising computer program code that, when executed by an information handling system, enhances system security by performing actions comprising:

receiving one or more monitoring authorization settings from a first user, wherein the monitoring authorization settings comprise a set of users authorized to monitor a first account associated with the first user, a set of selected activities to be monitored, and one or more remote security actions that the set of users is allowed to remotely perform on the first account, wherein the set of users does not include the first user;

sending notifications to the set of users responsive to a detection of one of the selected set of activities occurring on the first account;

after the sending, receiving a security response from a second user included in the set of users, wherein the security response includes a remote signoff command; and in response to receiving the security response and determining that the remote signoff command is one of the one or more remote security actions that the set of users is allowed to remotely perform, remotely signing the first computer user off the first account.

16. The computer program product of claim 15 wherein the set of users and the first user each belong to a common online social network.

17. The computer program product of claim 15 wherein the set of users and the first user each belong to a common organization.

18. The computer program product of claim 15 wherein the actions further comprise:

providing knowledge of the detected activity occurring on the first account to the set of users, while inhibiting access to first account content data from each of the set of users.

19. The computer program product of claim 15 wherein the actions further comprise:

responsive to receiving the security response from the second user:

comparing the received security response to the one or more remote security actions that the set of users is allowed to remotely perform on the first account; and in response to determining that the remote signoff command is not one of the one or more security actions that the set of users is allowed to remotely perform on the first account, inhibiting performance of the remote signoff command.

20. The computer program product of claim 15 wherein the actions further comprise:

identifying a set of appropriate security actions based on the detected activity occurring on the first account;

comparing the remote signoff command received from the second user to the set of appropriate security actions;

performing the remote signoff command in response to the comparison revealing that the remote signoff command matches one of the set of appropriate security actions; and inhibiting performance of the remote signoff command in response to the comparison revealing that the remote signoff command fails to match at least one of the set of appropriate security actions.

* * * * *